US005609461A

United States Patent [19]
Lichtenberg

[11] Patent Number: 5,609,461

[45] Date of Patent: Mar. 11, 1997

[54] MOTORCYCLE DOLLY

[75] Inventor: Bruce A. Lichtenberg, Valencia, Calif.

[73] Assignee: Cycle Products of California, Inc., Valencia, Calif.

[21] Appl. No.: 554,592

[22] Filed: Nov. 6, 1995

[51] Int. Cl.$^6$ ..... B60P 3/00

[52] U.S. Cl. ..... 414/426; 280/79.11; 280/79.4

[58] Field of Search ..... 414/589, 590, 414/467, 495, 498, 462, 426, 427, 428, 429, 430; 104/44, 45; 280/79.11, 2, 79.4, 79.7

[56] References Cited

U.S. PATENT DOCUMENTS

| | | | |
|---|---|---|---|
| 2,980,270 | 4/1961 | Elliott et al. | 280/79.11 X |
| 3,997,186 | 12/1976 | Pottoroff | 280/402 |
| 4,154,352 | 5/1979 | Fowler | 414/495 |
| 4,243,243 | 1/1981 | Edmisten | 280/446 |
| 4,749,317 | 6/1988 | Daniel | 410/26 |
| 4,752,177 | 6/1988 | Zenna | 414/495 |
| 4,852,779 | 8/1989 | Berg | 224/42.32 |
| 4,895,319 | 1/1990 | Bardsen et al. | 414/426 X |
| 4,901,647 | 2/1990 | Drabing | 414/551 X |
| 4,932,829 | 6/1990 | Miller | 414/462 |
| 5,234,307 | 8/1993 | Scott | 414/467 |
| 5,335,923 | 8/1994 | Langenbach et al. | 280/79.11 |
| 5,409,335 | 4/1995 | Beck | 410/105 |
| 5,486,014 | 1/1996 | Hough | 280/79.11 |

FOREIGN PATENT DOCUMENTS

| | | | |
|---|---|---|---|
| 60863 | 3/1990 | Japan | 280/79.4 |

*Primary Examiner*—Frank E. Werner
*Attorney, Agent, or Firm*—Jack C. Munro

[57] ABSTRACT

A motorcycle dolly which is composed of an elongated rigid chassis from which extends intermediate the ends of the chassis and at one side thereof a kickstand support platform. The chassis includes an elongated channel which is to be located close to the supporting surface thereby making it easy to move the tires of a motorcycle to within the channel. The kickstand of the motorcycle is to be supported on the kickstand support platform. The kickstand support platform and the chassis are to be movable on the supporting surface by wheels. The wheels that are connected to the chassis on the same side from which extends the kickstand support platform include a locking device so that the motorcycle dolly can be fixed in position while the motorcycle is being moved onto the dolly or being moved off the dolly.

1 Claim, 1 Drawing Sheet

MOTORCYCLE DOLLY

BACKGROUND OF THE INVENTION

1) Field of the Invention

The field of this invention relates to dollies in the form of a cart with small wheels for moving heavy objects and more particularly to a dolly that is designed in particular to be used in conjunction with a motorcycle.

2) Description of the Prior Art

Motorcycles, like automobiles, are commonly stored within garages. Generally the garage is of sufficient size to store both a motorcycle and an automobile. The motorcycle is normally maneuvered by the rider to a position alongside a sidewall of the garage so as to provide adequate room for the storage of the automobile. At times it is difficult to maneuver a motorcycle to the desired location within the garage.

Some motorcycles are quite large in size and inherently quite heavy in weight. The maneuvering of such a large sized motorcycle and heavy motorcycle is difficult for most individuals, especially for an individual who is not particularly strong. There is a need to construct a dolly which provides for the locating of a motorcycle thereon with this dolly to be easily maneuverable within a confined space so as to locate the motorcycle in a desired out of the way location while it is being stored.

SUMMARY OF THE INVENTION

The structure of the present invention is directed to a dolly designed to store a single motorcycle. The dolly is in the form of an elongated, rigid, channel-shaped chassis which is mounted on caster-type wheels. The positioning of the wheels is such that the bottom wall of the channel is located very near the supporting surface which will normally be a floor of a garage or similar type of structure. The actual distance to the inner surface of the channel is to be less than one inch distance from the supporting surface with generally one-half inch or less being preferred. The reason for this is so as to make it easy for individuals, even individuals of diminished strength, to roll a motorcycle within the channel. From one side of the channel, which can be referred to as the right side, there extends a channel-shaped platform whose length is substantially shorter than the length of the chassis. The kickstand of the motorcycle is to rest on this platform. The undersurface of the platform also has mounted wheels which are to be in contact with the supporting surface. The wheels that are mounted on the side of the chassis from which extends the platform include locking devices that fix these wheels in position thereby preventing low frictional rolling movement of the chassis on the supporting surface. Fixing in position of the chassis is desired during the time that the motorcycle is moved in position on the chassis or removed from the chassis.

The primary objective of the present invention is to construct a dolly which is designed for supporting a motorcycle with the dolly then to be easily moved to any desired confined quarters situation even by individuals of diminished strength, such as women and children therefore maximizing storage and parking space for other types of vehicles within a garage or other similar type of environment.

Another objective of the present invention is to construct a motorcycle dolly that facilitates maneuverability of the motorcycle permitting rotating of the motorcycle a full 180 degrees within its own length thereby allowing the rider to ride the motorcycle out of a garage or storage area without requiring the user to back up the motorcycle when removing it from the garage or storage area.

Another objective of the present invention is to construct a motorcycle dolly which is of strong metal construction such as steel, which is attractive in appearance, weighs only approximately 65 pounds and yet is capable of supporting a one thousand pound motorcycle.

Another objective of the present invention is to construct a motorcycle dolly which can be manufactured at a reasonable cost and thereby sold to the ultimate consumer at a reasonable cost.

DETAILED DESCRIPTION OF THE PREFERRED EMBODIMENT

Figure 1:
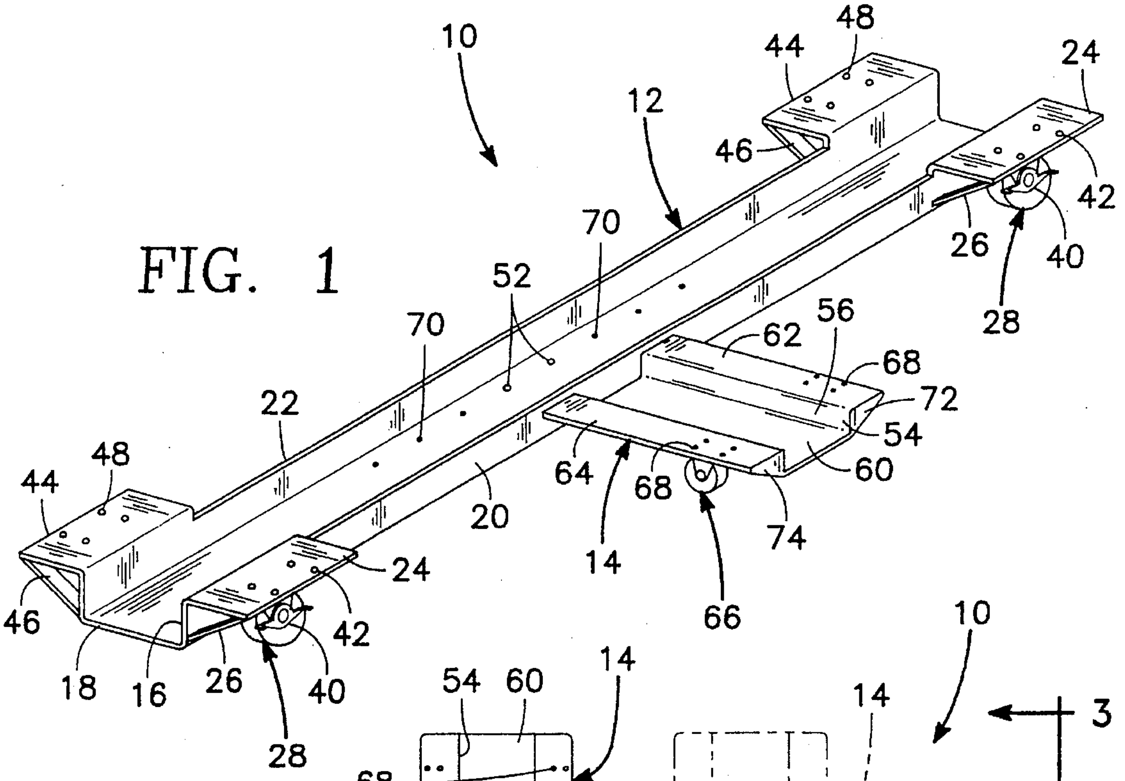
FIG. 1 is an isometric view of the motorcycle dolly of the present invention.

Referring particularly to the drawings, there is shown the motorcycle dolly 10 of this invention. The motorcycle dolly 10 includes a chassis 12 and a kickstand support platform 14. The chassis 12 is to be formed of a rigid, sheet material with generally steel being preferred. The chassis 12 includes an elongated open-ended channel 16 which is formed by a sheet material bottom 18 which is integrally connected at each side thereof to upstanding sidewalls 20 and 22. The sidewalls 20 and 22 are of the same height and are located parallel to each other. The width of the channel 16 would generally be about seven and one-half inches with the height of the sidewalls 20 and 22 being about two inches.

Integrally connected to the sidewall 20 at each end thereof is a wheel mounting flange 24. Each flange 24 is also formed of sheet material. Each wheel mounting flange 24 is braced by a pair of inclined braces 26 which extend from the outer free edges of the flanges 24 to the bottom 18. It is to be understood that the braces 26 will be attached as by welding. In between each of the braces 26 of each flange 24 is mounted a caster wheel assembly 28. The caster wheel assembly 28 includes a wheel 30 which is rotationally mounted on a bifurcated arm arrangement 32. The bifurcated arm arrangement 32 is mounted onto a lower bearing plate 34. The lower bearing plate 34 is connected through a series of ball bearings 35 to an upper bearing plate 36. As a result the wheel 30 is capable of being pivoted 360 degrees relative to the upper bearing plate 36. The wheel 30 is also capable of being rolled on the supporting surface 38. This rolling of the wheel 30 is permitted since the wheel 30 is pivotally mounted on the bifurcated arm assembly 32.

Figure 3:
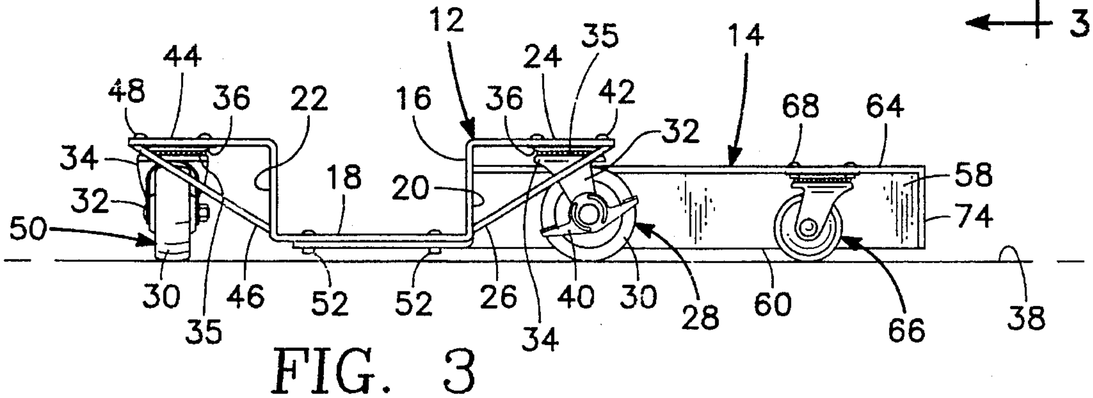
FIG. 3 is an end view of the motorcycle dolly of this invention taken along line 3—3 of FIG. 2.

Also included within the wheel assembly 28 is a pivotable lever 40. Movement of the lever 40 to the position shown in FIG. 3 will result in the wheel 30 being prevented from pivoting relative to the bifurcated bracket 32. However, manual movement of the lever 40 about 25 to 30 degrees in a counterclockwise direction will result in unlocking of the wheel 30 from the bifurcated bracket 32 which will permit the wheel 30 to low frictionally roll on the supporting surface 38. The manual movement of the lever 40 is normally accomplished by means of foot pressure applied by the human user (not shown). The upper bearing plate 36 is fixedly mounted by conventional bolt fasteners 42 onto each of the wheel mounting flanges 24.

Integrally connected at each end of the sidewall 22 is a wheel mounting flange 44. The wheel mounting flanges 44 are basically similar to the wheel mounting flange 24 except that such extend in opposite directions. The outer edge of each of the wheel mounting flanges 44 is braced by means of inclined braces 46 which comprise narrow strips similar to braces 26 which extend from the outer free edge of the wheel mounting flanges 44 to the bottom 18. Connected by bolt fasteners 48 are caster wheel assemblies 50. The caster wheel assembly 50 is basically similar to caster wheel assembly 28 except it does not include the locking lever 40.

Kickstand support platform 14 is fixedly mounted to the bottom 18 by means of a plurality of conventional bolt fasteners 52. This kickstand support platform 14 will normally be about seventeen inches in length with the chassis 12 being about 78 inches in length. The kickstand support platform 14 includes a channel 54 which is located between a pair of upstanding sidewalls 56 and 58. Connected between the sidewalls 56 and 58 is a bottom 60. Integrally connected to the sidewall 54 and extending outwardly therefrom is a wheel mounting flange 62 with a similar wheel mounting flange 64 being integrally connected to the sidewall 58 and extending outwardly therefrom. A caster wheel assembly 66 is to be mounted by conventional bolt fasteners 68 to the undersurface of both flanges 62 and 64. The caster wheel assembly 66 is basically identical to the caster wheel assembly 50. The caster wheel assemblies 66 will also ride on the supporting surface 38. The outer end of wheel mounting flange 62 and sidewall 54 is closed by end plate 72 which also braces the flange 62 to bottom 60. Similarly, the flange 64 and sidewall 58 is braced by end plate 74.

Figure 2:
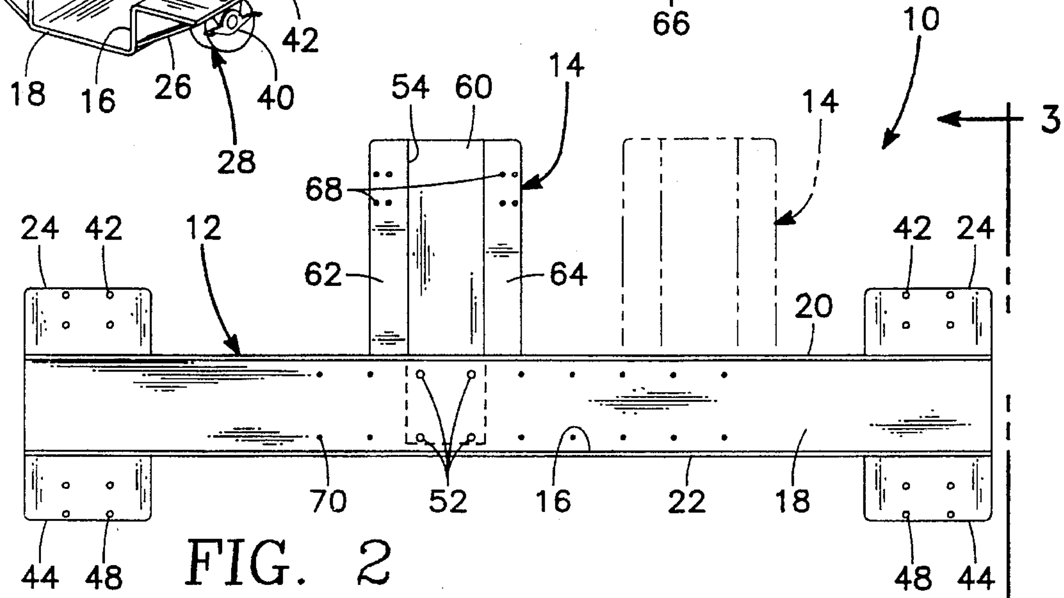
FIG. 2 is a top plan view of the motorcycle dolly of this invention.

The operation of the dolly 10 of this invention is as follows: The dolly 10 will be located in the position shown in FIG. 1 on a supporting surface 38 which for example could be the floor of a garage. Normally the dolly 10 will be located some spaced distance from the walls of the garage so free access to the dolly 10 is permitted. The user then proceeds to move the levers 40 of the two locking wheel assemblies 28 to the locked position. As a result the dolly 10 will then be maintained in its established position with rolling movement being prevented. A motorcycle (not shown) will then be rolled onto the channel 18 with the direction of installation of the motorcycle being such that the kickstand (not shown) of the motorcycle is able to connect with the channel 60 of the kickstand support platform 14. It is to be noted that the inner or upper surface of the bottom 18 is to be located less than one inch in distance from the supporting surface 38. Actually the preferable distance is about one-half inch. The reason for this is so that the tires of the motorcycle can be readily rolled up onto the bottom 18 even by individuals of diminished strength such as women and children. With the tires of the motorcycle both resting on the bottom 18, the user then displaces the kickstand to a down position with the outer end of the kickstand resting on the bottom 60 of the channel 54. It is to be understood that for different motorcycles that the kickstands are located in different locations. Therefore, the position of the kickstand support platform 14 can be adjusted on the chassis 12 with this adjustment being shown in dotted lines in FIG. 2 of the drawing. When the desired location is obtained for the kickstand support platform 14, the bolts 52 are to engage with the appropriate holes 70 formed within the bottom 18 that correspond to the particular location of the kickstand support platform 14.

What is claimed is:

1. A motorcycle dolly comprising:

a rigid chassis having an elongated channel of sufficient length to support both tires of a motorcycle, said chassis having a right side and a left side, said elongated channel terminating in a pair of opposite ends, at least one of said opposite ends being open ended, said channel being formed by a planar sheet material bottom and mounted between upstanding sidewalls with one said sidewall located at said right side and the remaining said sidewall located at said left side, said planar sheet material bottom being located a short distance from a supporting surface on which said chassis is located;

a plurality of first wheels being mounted on said chassis, said first wheels adapted to ride on the supporting surface locating said bottom said short distance from the supporting surface, said first wheels permitting easy manual movement of said chassis on the supporting surface;

a kickstand support platform fixed directly to and intermediate the length of said right side of said chassis, said kickstand support platform extending laterally from said right side, second wheel means mounted on said kickstand support platform, said second wheel means adapted to rest on the supporting surface;

whereby both tires of a motorcycle are to be located within said channel with the kickstand of the motorcycle resting on said kickstand support platform; and there being at least two in number of said first wheels along said right side and at least two in number of said first wheels along said left side, said wheels located along said right side including fixing means, said fixing means being manually movable to fix in position said first wheels to prevent said first wheels from rolling movement on said supporting surface.

* * * * *